United States Patent [19]

Scherwarth

[11] 4,351,359

[45] Sep. 28, 1982

[54] FAST CLOSING VALVE FOR GASEOUS AND LIQUID MEDIA

[76] Inventor: Manfred Scherwarth, Fichtenweg 31, Sulzbach/Saar, Fed. Rep. of Germany, 6603

[21] Appl. No.: 177,770

[22] PCT Filed: Apr. 14, 1979

[86] PCT No.: PCT/DE79/00040

§ 371 Date: Dec. 17, 1979

§ 102(e) Date: Dec. 17, 1979

[87] PCT Pub. No.: WO79/00935

PCT Pub. Date: Nov. 15, 1979

[30] Foreign Application Priority Data

Apr. 15, 1978 [DE] Fed. Rep. of Germany ....... 2816373

[51] Int. Cl.³ .................... F16K 17/26; A62B 13/00
[52] U.S. Cl. ......................................... 137/521; 98/119
[58] Field of Search .............. 137/498, 517, 518, 521; 98/119

[56] References Cited

U.S. PATENT DOCUMENTS 2,749,833  6/1956  Hekelaar .................. 137/504 X
3,111,078  11/1963  Breckenridge ................... 98/119
3,139,811  7/1964  Sickel et al. ................ 137/521 X
3,173,356  3/1965  Schierse et al. ................... 98/119

FOREIGN PATENT DOCUMENTS 2349082  6/1974  France .

Primary Examiner—William R. Cline
Attorney, Agent, or Firm—John J. Dennemeyer

[57] ABSTRACT

A fast closing valve for gaseous and liquid medium closes, against a resilient force, upon the occurrence of a sudden pressure difference in the conduit, specially aeration conduits for use in anti-aircraft protection shelters. The main part is a valve-flap having the form of a dihedron (10), which is mounted, pivoting easily within a chamber (9) about the axis of the vertex of the dihedron (axis 11). On either side of the valve-flap (10a, 10b) are associated deviation openings (7,8) of the chamber (9) which will be closed alternately by the pivoting of the flap (10). The flap (10) is normally held in a stable open position by a spring arrangement (14) until one or the other of the flap sides is subject to a pressure wave causing the closure of one or the other of the openings (7,8).

10 Claims, 5 Drawing Figures

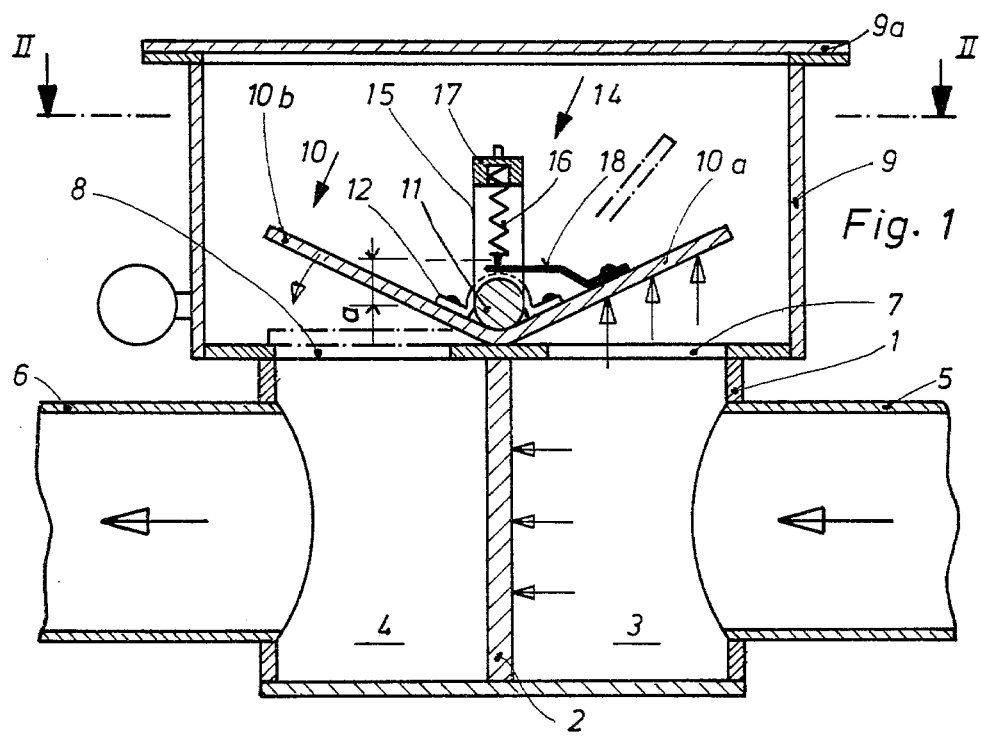
Fig. 1
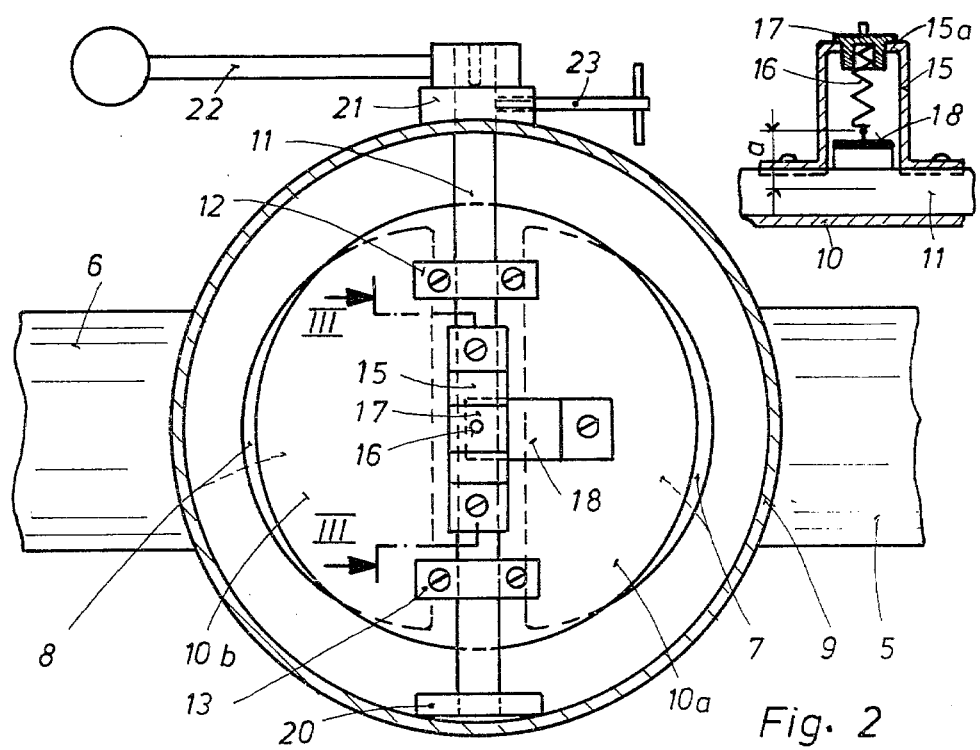
Fig. 2
Fig. 3

FAST CLOSING VALVE FOR GASEOUS AND LIQUID MEDIA

BACKGROUND OF THE INVENTION

The invention concerns a rapid acting valve for gaseous and liquid media which is maintained in the open position by the force of a spring and closes against the force of the spring in the case of a sudden difference in pressure in the line against the force of the spring. Known rapid acting valves of this type have swivelling flaps or valve disks located in the direction of the flow of the medium which are directly exposed to pressure impacts so that the closing element strikes the valve seat with a high velocity and may thus be damaged.

SUMMARY OF THE INVENTION

It is the object of the invention to provide a rapid acting valve that is not exposed directly to pressure impacts in the line, but still closes at least as rapidly as rapid closing valves of the known type. This object is attained according to the invention by housing the valve in a connecting part which contains a baffle plate extending transversely with respect to the flow of the medium. The baffle plate divides the connecting part into two chambers, each opening through a separate diverting orifice into a common valve chamber. An angular valve disk is located in the valve chamber with an axis of rotation lying in the plane of the baffle plate and between the two adjacent diverting orifices. The angular valve disk is mounted in a readily rotatable manner and at least one of the legs is inclined with respect to the other. The legs of the valve disk are adapted in their outline to one of the two diverting orifices to be closed, and a spring arrangement maintains the valve disk in a rotationally stable open position wherein the two legs of the valve disk are inclined with respect to the planes passing through the diverting orifices. Pressure impacts, resulting from pressure differences within the lines, interrupted by the rapid acting valve are now intercepted by the baffle plate so that an increase in pressure, reduced by turbulence, is created, in the associated valve chamber, which impacts an inclined leg of the valve disk through one of the diverting orifices. Because this leg of the valve disk, by means of its readily rotatable manner of mounting, will give way, the other leg of the valve disk will be rotated against the other diverting orifice, closing it since its configuration is adapted to the diverting orifice associated with it. To this extent, the invention concerns a valve closing only in one direction of flow, for example, an air valve for the ventilation of shelters which must close only when pressure impacts are generated outside the shelter by explosion and when such impacts are to be kept out of the shelter.

When the valve of the present invention is used in a gaseous medium, the conversion of pressure impacts in front of the baffle plate by means of turbulence and the shock wave into a reduced rise in pressure to activate the angular valve disk is particularly apparent due to the compressibility of the gaseous medium. Unexpectedly, the rapid acting valve according to the invention may also be used for liquid media, because here again the diversion of the flow in itself effects a certain destruction of the kinetic energy of the pressure impact, accompanied by the advantage that the leg of the valve disk associated with the diverting orifice to be closed is already in its closing position even before it is impacted by the sudden change in pressure.

The arrangement of the string may be arbitrary, because in keeping with the state of the art it has the function of maintaining the valve disk which according to the invention is angular in configuration and readily rotatable in the open position when normal conditions of flow are prevailing and to return it into said open position, when following a pressure impact normal flow conditions have been restored.

As mentioned hereinabove, in principle only, one of the legs of the valve disk must be designed to close the diverting orifice associated with it, while in such a case the other leg serves merely as the activating arm, being impacted by the diverted flow from the valve chamber associated with it. In a further embodiment of the invention, a rapid acting valve capable of closing in both directions is obtained by that both of the legs of the valve disk are adapted in their outlines to one of the associated diverting orifices to be closed alternatingly.

In order to avoid throttling losses during the prevalence of normal conditions of flow, it is appropriate to keep the cross section of each of the diverting orifices approximately equal to the cross section of the pipeline. Further developments of the invention are given in the description that follows which includes different spring arrangements, together with the possibility of operating the singly or doubly closing angular valve disk by hand. One form of embodiment includes means for manual operation, wherein a manually operated actuating shaft is associated transversely to the axis of rotation with the angular valve disk making it possible to mount the valve disk with the axle of rotation and the actuating shaft as a single structural unit.

BRIEF DESCRIPTION OF THE APPLICATION DRAWINGS

The drawing shows two examples of embodiment of a rapid acting valve according to the invention. In the drawing:

FIG. 1 shows a vertical section through the valve and the inlet and outlet parts of the line.

FIG. 2 a horizontal section on the line II—II in FIG. 1;

FIG. 3 a detail in a section on the line III—III in FIG. 2;

FIG. 4 another example of embodiment in a vertical section through an angular valve disk in a perspective representation, and FIG. 5 a detail of the example of embodiment of FIG. 1.

DETAILED DESCRIPTION OF THE PREFERRED EMBODIMENTS

Figure 4:
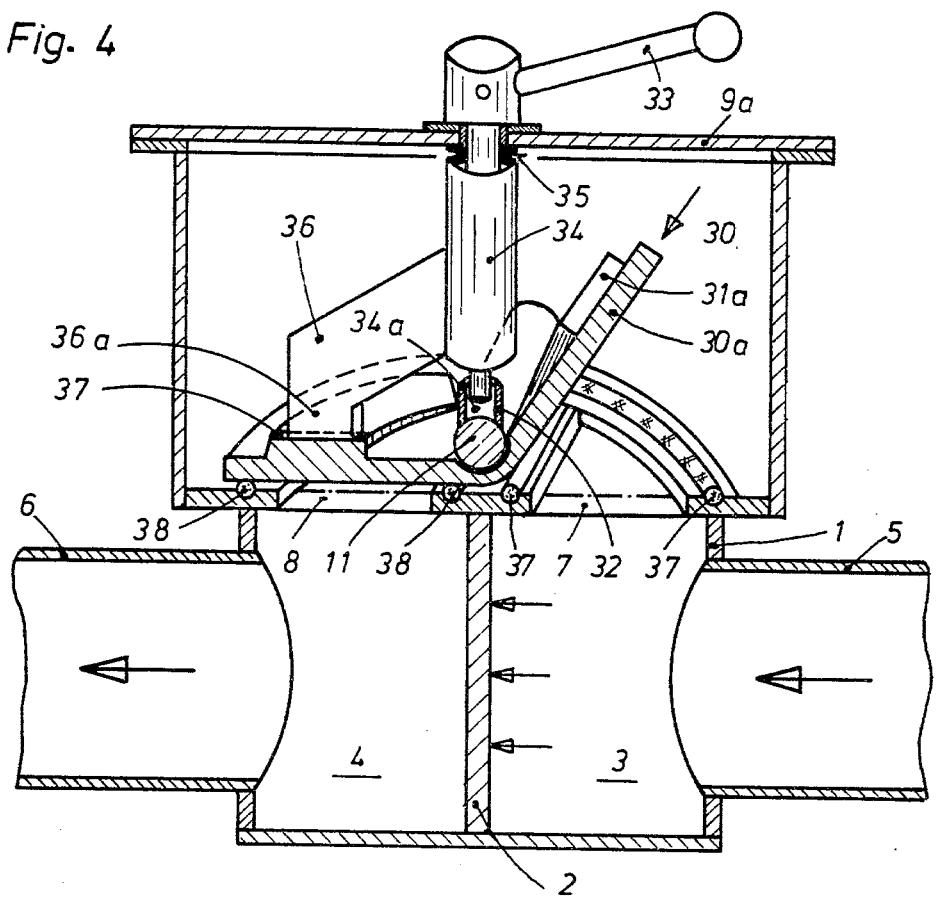

As seen in FIGS. 1 and 2, the rapid acting valve consists of a connecting part 1 with a baffle plate 2 extending transversely to the flow of the medium, the baffle plate 2 dividing the connecting part into two chambers 3 and 4, to which the inlet line 5 and the outlet line 6 are connected. Transversely to the impact plate 2 and in the same plane, the chambers 3 and 4 are provided with upper diverting orifices 7 and 8 which open into a common valve chamber 9. Within the valve chamber 9, there is an angular valve disk 10 with the valve disk legs 10a and 10b, mounted easy rotation on the rotational axle 11, by means of two flat iron straps 12 and 13 (FIG. 2). By means of the spring arrangement 14 to be described in more detail hereinbelow, the valve disk 10 is maintained in its stable open position shown in FIG. 1 under normal flow conditions, the two valve disk legs 10a and 10b are inclined with respect to the plane through the diverting orifices 7 and 8 which is common to both in this example the illustrated embodiment. The flow of air is thus able to pass from the part 5 of the line by way of the chamber 3, the diverting orifice 7, the common valve chamber 9, the diverting orifice 8 and the chamber 4, without hindrance into the part 6 of the line. The ability of the angular valve disk 10 to remain in its stable open rotational position is a function of the spring force within the spring arrangement 14 in the case of normal flow velocities.

The spring arrangement is best understood with reference to the embodiment as seen in FIG. 3 in combination with FIGS. 1 and 2, and is designed for manual rotation of the rotating axle 11, thus making possible the manual actuation of the valve. It is essential in this respect that the spring arrangement 14 is rotatingly joined with the rotational axis 11, which serves as the actuating shaft. For this purpose, a U-shaped strap 15 is fastened to the actuating shaft 11 with a tension spring 16 secured to the web 15a thereof. The spring 16 engages the web 15a and is abutting against a stop plate 17, so that the spring 16 may be replaced readily with another one. The other end of the tension spring 16 is fastened under a lever arm a to the angular valve disk 10 by means of a rigid shackle 18 bolted to the disk leg 10a.

The actuating shaft 11 is supported at one end within a pillow block 20 in the common valve chamber 9 and extending with its other end outwardly from the valve chamber 9 where it is supported in a welded-on bearing ring 21. A manual lever 22 is rotatingly joined with the actuating shaft 11. An adjusting screw 23 is screwed into the bearing ring 21 by means of which the actuating shaft 11 may be secured in any rotational position.

The mode of operation of a rapid acting valve according to FIGS. 1 to 3 is as follows:

Normally, the actuating shaft or rotational axle 11 is secured by means of the adjusting screws 23 in a rotating position wherein the strap 15 stands vertically and the tension spring 16 is aligned with the lever arm a, below which the tension spring engages the valve disk 10. It is readily seen that then the tension spring 16 is in its shortest configuration and that it is holding the valve plate 10 in its stable open rotating position shown in FIG. 1. When a pressure impact is promulgated along part 5 of the line in the direction indicated by the arrow, its kinetic energy is destroyed at the baffle plate 2. In the associated chamber 3 within the connecting part 1, a rise in pressure reduced by turbulence and (in case of a gaseous medium) by the shock wave, is generated, leading to a diverted flow in the upward direction through the diverting orifice 7 and impacting the leg 10a of the valve disk. The sudden rise in pressure applies a torque force in the counterclockwise direction on the angular valve disk 10, so that the valve disk is rotated in the swivel position shown by the dash-and-dot line, wherein the leg 10b of the valve disk closes the diverting orifice 8. Because this swivelling motion around the shackle 18 the lower abutment of the tension spring 16 describes a circular arc around the lever arm a, while the other end of the tension spring 16 secured at 17 remains in its spatial position, because the actuating shaft 11 and thus the strap 15 are immobile, the transfer of the leg 10b into its closing position shown by the dash-and-dot line effects an extension of the tension spring 16. The lever arm a and the tension spring 16 in the process form an obtuse angle. The extension of the tension spring 16 effects the immediate return of the valve disk 10 into the stable, open rotational position, as soon as the pressure impact has attenuated.

It is obvious that the same function will be performed in the case of a pressure impact coming from the part 6 of the line, if the leg 10a is also adapted in its outline to the diverting orifice 7 to be closed, as shown in FIG. 2. Referring to FIG. 2, the symmetrical layout of the legs 10a and 10b is seen, the legs being inclined in the stable open rotating position so that the diverting orifices 7 and 8 are just visible in the form of two sickle shaped sections, while the rest of the outline of the diverting orifices is shown by a broken line.

For the manual operation of the valve, the adjusting screw 23 is released and the manual lever 22 rotated in one of the two directions, whereby the strap 15 and the tension spring 16 are also rotated. Because the tension spring 16 tends to hold the lever arm a in alignment with itself, the angular valve disk 10 is carried along. When during the rotation of the actuating shaft 11 in a counterclockwise direction, the leg 10b of the disk arrives in its closing position indicated by the dotted line, the actuating shaft 11 may be further rotated to a slight degree, so that the tension spring 16 applies a certain torque in the closing position, in order to insure the tight closing of the diverting orifice 8. Subsequently, the adjusting screw 22 is actuated to secure the rotational position of the actuating shaft 11. This manual closing of the valve in one or the other direction is indicated when in the use of rapid acting valves according to the invention for air raid shelters, the appearance of bacteriological or chemical warfare substances must be expected. Obviously, a separate closing valve may also be used for the manual closing of the line 5, 6. In such a case, the shaft 11 may be stationary in the manner of a rotational axle and it is conceivable to select a spring arrangement wherein the rotating strap 15 is not needed and wherein a tension spring is secured to the cover 9a of the common valve chamber 9. It is essential, however, that in the stable open rotational position of the angular valve plate 10, the tension spring be aligned with the lever arm a and that it be extended in the closed position caused by a pressure difference in the line.

Figure 5:
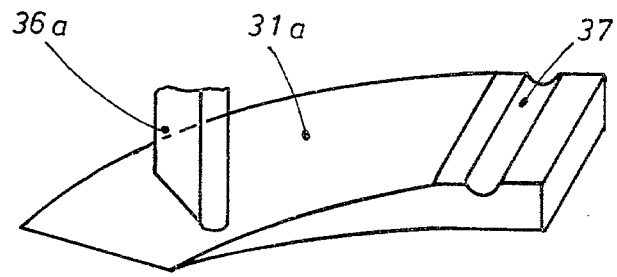

The embodiment shown in FIGS. 4 and 5 is directed at another possible arrangement of manual closing, with the purpose of obtaining larger closing forces. The spring arrangement to set the rotationally stable open position of the angular valve disk according to FIG. 1 is arbitrary and thus not shown in detail. It is seen in FIG. 4 that both legs 30a and 30b of the valve disk are provided, on their rear surfaces facing away from the closing surface, with helically and opposingly rising wedges 31a and 31b. The rotational axle 11 is supported in two bearing blocks, not shown, so that it may be inserted from above, together with the angular valve 30, into the common valve chamber 9. The rotating bearing may be provided, as in FIGS. 1 and 2, in the form of the straps 12 and 13. The rotational axle 11 has a radial flanged socket 32, wherein the gudgeon 34a of an actuating shaft 34 extending transversely to the rotational axle 11 is engaged. The actuating shaft 34 rests by means of an annular spring 35 on the cover 9a of the valve chamber 9 in an axially mobile manner. The actuating shaft 34 carries a manual lever 33 and is provided with a radial arm 36 having a ledge like pressuring piece 36a, which depending on the direction of rotation of the actuating shaft 34, runs up on the wedge 31a or the wedge 31b, thus forcing the rotation of the valve disk 30 into its closing position. In FIG. 4, the leg 30b of the valve disk is in the closed position, thus sealing the diverting orifice 8.

The manual closing mechanism using ascending wedges provides greater closing forces, therefore, it is advisable to surround the diverting orifices 7 and 8 to be closed with gaskets 37 and 38. In order not to exceed the elasticity of the gaskets, an annular spring 35 is provided so that the actuating shaft 34 may give way with its radial arm 36 in the axial direction.

Because the rise of the wedges 31a and 31b is within the range of self-retention, any closing position is secured by the friction between the wedge and the pressure piece 36a. However, in order to better define the closing position and render it tangible, the wedges are equipped with a retaining notch coordinated with each of the legs of the valve disk, as shown in FIG. 5 at 39 for the helical wedge 31a. In FIG. 4, the section passes through such a notch 39 in wedge 31b. The securing of closing positions by means of arresting notches 39 requires the elastic gaskets 37, 38 and/or the axial support of the actuating shaft 34 by means of the annular spring 35.

The rapid acting valve according to the invention may also be used advantageously as a check valve in pipe lines connected with industrial furnaces, for example, blast furnaces.

I claim:

1. A rapid acting valve for a fluid media which closes in response to a sudden pressure difference in a fluid flow line, said valve comprising:
    a valve housing having a fluid passage therethrough;
    a baffle plate positioned in said housing transverse to the flow of fluid media and dividing said housing into two antechambers;
    a common valve chamber in fluid communication with each of said antechambers, each antechamber opening into said common valve chamber through a separate diverting orifice;
    an angular valve disk rotatably mounted in said common valve chamber with the axis of rotation of said valve disk lying in the plane formed by said baffle plate and between the diverting orifices;
    said valve disk including at least two leg portions, at least one leg portion being inclined with respect to the other and having a configuration which conforms to and closes an associated diverting orifice;
    means for spring biasing said valve disk in a rotationally stable open position with both of said leg portions being inclined with respect to the plane passing through the associated diverting orifices whereby a pressure pulse resulting from pressure differences within the line is intercepted by said baffle plate thereby reducing the resulting pressure increase which impacts one of said inclined legs through an associated diverting orifice to rotate said disk against the force of said spring bias means thus closing said valve.

2. A valve as recited in claim 1, wherein each of said leg portions of said disk have a configuration which conforms to and closes the associated diverting orifice.

3. A valve as recited in claim 1 or 2, wherein each of the diverting orifices have a cross-section about equal to the cross-section of the fluid flow line.

4. A valve as recited in claim 1 or 2, wherein said spring bias means comprises:
    a tension spring;
    means for fastening one end of said spring to said valve chamber; and
    means for fastening the other end of said spring to said valve disk, said other end being spaced a distance from the axis of rotation of said disk to form a lever arm which is substantially in line with the stable tensile forces of said spring when said disk is in the open position, said spring biasing said lever arm to assume an in-line position when said valve is closed.

5. A valve as recited in claim 1 or 2, further comprising:
    an actuating shaft for rotatably supporting said valve disk and including a manual lever, said actuating shaft being securable in at least one rotating position with respect to said valve chamber; and
    means for attaching said spring bias means for rotation with said actuating shaft whereby the rotation of said shaft to the secured position moves said valve disk to the closed position.

6. A valve as recited in claim 5, wherein said securing means comprises:
    a U-shaped member, the legs of which are fastened to said actuating shaft;
    a tension spring, one end of which is fastened to the connecting portion of said U-shaped member; and
    means for fastening said other end of said spring to said valve disk; said other end being spaced a distance from the axis of rotation of said valve disk to form a lever arm which is substantially in line with the tensile forces of said spring when said disk is in the stable open position, said spring biasing said lever arm to assume an in-line position when said valve is closed.

7. A valve as recited in claim 1 or 2, further comprising:
    a rotatable shaft extending transversely to the rotational axis of said valve disk;
    a radial arm attached to said rotatable shaft and engaging said valve disk; and
    said valve disk including a helically rising wedge whereby the rotation of said shaft moves said arm along said rising wedge of said disk to secure said disk in a closed position.

8. A valve as recited in claim 7, further comprising: an elastic gasket surrounding the diverting orifice to be closed.

9. A valve as recited in claim 8, further comprising: means for supporting said rotatable shaft in an axially movable manner.

10. A valve as recited in claim 8, wherein said helically rising wedge has an arresting notch indexed with the closing position of said arm.

* * * * *